(12) United States Patent
Montebovi

(10) Patent No.: US 7,469,153 B2
(45) Date of Patent: Dec. 23, 2008

(54) MOBILE TELECOMMUNICATIONS DEVICE BROWSER

(75) Inventor: Franco Montebovi, Lund (SE)

(73) Assignee: Nokia Corporation, Espoo (FI)

( * ) Notice: Subject to any disclaimer, the term of this patent is extended or adjusted under 35 U.S.C. 154(b) by 617 days.

(21) Appl. No.: 09/941,857

(22) Filed: Aug. 30, 2001

(65) Prior Publication Data
US 2003/0045331 A1 Mar. 6, 2003

(51) Int. Cl.
H04B 1/38 (2006.01)

(52) U.S. Cl. .................. 455/566; 345/5; 379/355.09; 715/789

(58) Field of Classification Search ............. 345/418, 345/169, 744, 5, 810; 455/414.1, 412.2, 455/414.3, 566; 709/217; 340/7.53; 715/764, 715/789; 370/352; 379/355.09
See application file for complete search history.

(56) References Cited

U.S. PATENT DOCUMENTS 5,758,295 A    5/1998   Ahlberg et al.
5,854,630 A    12/1998  Nielsen et al.
6,304,746 B1 *  10/2001  Fascenda et al. ........... 340/7.53
6,463,304 B2 *  10/2002  Smethers .................... 455/566
6,593,944 B1 *  7/2003   Nicolas et al. .............. 345/744
6,727,891 B2 *  4/2004   Moriya et al. ............... 345/169
7,007,237 B1 *  2/2006   Sharpe ....................... 715/764
2001/0008399 A1 *  7/2001   Oosterholt et al. ......... 345/418
2001/0017855 A1 *  8/2001   Ishigaki ..................... 370/352
2002/0032745 A1 *  3/2002   Honda ....................... 709/217
2002/0081997 A1 *  6/2002   Morishima .................. 455/566

FOREIGN PATENT DOCUMENTS

EP    0243671    11/1987
WO    0128199    4/2001

* cited by examiner

Primary Examiner—Gerald Gauthier
(74) Attorney, Agent, or Firm—Banner & Witcoff, Ltd.

(57) ABSTRACT

A mobile, cellular telecommunications handset (MS1) has a browser to navigate between and provide a display (5) of data from different network addresses. A key (4b) on the device is operable in a first mode e.g. a relatively short press, to navigate between previously listed network addresses. The key is also operable in a second mode e.g. a relatively long press, to provide a selective display of only previously visited homepages so that the user can quickly select a homepage from the previously visited homepage display and navigate directly to the selected homepage.

10 Claims, 4 Drawing Sheets

MOBILE TELECOMMUNICATIONS DEVICE BROWSER

BACKGROUND OF THE INVENTION

1. Field of the Invention

This invention relates to a mobile telecommunications device with an improved browser for navigating between pages at different network addresses and home pages.

2. Description of the Prior Art

Conventional mobile telecommunications devices such as telephone handsets, have been designed primarily for speech calls and have only a limited capability for handling data. For example, in GSM, a short message service (SMS) has been provided to permit the user to send and receive short text messages that can be transmitted through a cellular public land mobile network (PLMN). More recently, recommendations have been developed to provide a wireless application protocol (WAP) to promote common standards and specifications for data services that operate over wireless communication networks. WAP enabled telephone handsets have been developed which allow the user to access remote servers. Data content is provided in a mark up language, similar to conventional hyper text mark up language (HTML) known as a wireless mark up language (WML), which is configured to allow a page of HTML data to be displayed as a deck of individual cards which are of the size suited for display on the relatively small display screen usually available on a mobile device such as a cellular telephone handset or personal digital assistant (PDA).

The data is supplied by WML servers at individual network addresses, with a homepage which act as an entry point to a particular site together with further pages or decks with individual addresses that can be navigated by the user. To this end, the mobile device is provided with a browser to display the data.

A WML server can be accessed by dialing an individual telephone number associated with a WAP gateway which acts as a proxy server between the WML server itself and the mobile device, which acts as the client.

Newer, faster data services for mobile communication devices have been developed, including I-Mode, GPRS and UMTS which operate in a generally similar way, with the mobile device acting as client to remote servers, and a browser to display the accessed data on the mobile device. The browser that is used for mobile telecommunications devices is conventionally known as a microbrowser, which is controlled by keys on the mobile device. Instead of using a mouse-driven cursor, a focus region is provided, which can be navigated around the display by keys which may include a scrolling key on the mobile device. The keys may be so-called soft keys which can be preprogrammed to perform different functions depending on the display provided by the browser. Conventionally, one of the soft keys allows the user to move backwards through previously visited network addresses. Also, a bookmark list may be stored so that individual network addresses can be readily accessed.

In conventional Internet browsers for use on personal computers, such as Microsoft Internet Explorer and Netscape Communicator, back and forward buttons are provided in the browser display, to be actuated using the mouse and associated cursor. The cursor is moved using the mouse to overlie the button concerned, for example, the back button, and the left mouse button is then actuated so as to actuate the back button on the display, so as to allow the user to navigate between previously accessed network addresses. The forward button is operated in a similar way. The back and forward buttons may have an associated facility to display a list of the previously visited sites from which the user can select an individual address using the cursor. Also, U.S. Pat. No. 5,854,630 discloses a browser in which a list of visited network addresses is displayed when placing a cursor above the back or forward button in combination with long presses of either of the buttons. However, the mouse and cursor based functionality of a conventional Internet browser is not appropriate for a microbrowser used in a mobile communications device and so the speed of browsing with a microbrowser is significantly impaired as a result of the inability to readily access previously visited network addresses.

SUMMARY OF THE INVENTION

According to the invention, a mobile telecommunications device is provided, which includes a browser to navigate between different pages and display information therefrom. A key on the device is operable in a first mode, for example, a relatively short press, to navigate between previously visited pages. The key is also operable in a second mode, for example, a relatively long press, to provide a selective display of previously visited pages such as homepages so that the user can select a homepage from the previously visited homepage display and navigate directly to the selected homepage.

The key may be configured to navigate backwards through the previously visited pages or forwardly.

By displaying the previously visited homepages in the second mode, the user can use the key in order to navigate quickly back to the homepages of previously visited sites without having to pass laboriously through all the previously displayed network addresses for the non-homepage decks and cards visited during a particular session as occurs in the first mode.

The mobile telecommunications device may include a scrolling key operable by the user to scroll a focus region through the display of previously visited homepages for selecting one of them. A further key may be provided for selecting a homepage from the previously visited homepage display so that the browser navigates directly to it.

The device according to the invention may comprise a mobile telephone handset or a PDA.

Thus, in accordance with the invention, the user of a mobile device can readily display previously visited homepages and immediately navigate to them but without needing prior mouse and cursor based technology used in conventional personal computer browsers.

BRIEF DESCRIPTION OF THE DRAWINGS

In order that the invention may be more fully understood an embodiment thereof will now be described by way of example with reference to the accompanying drawings in which.

DETAILED DESCRIPTION OF THE INVENTION

Figure 1:
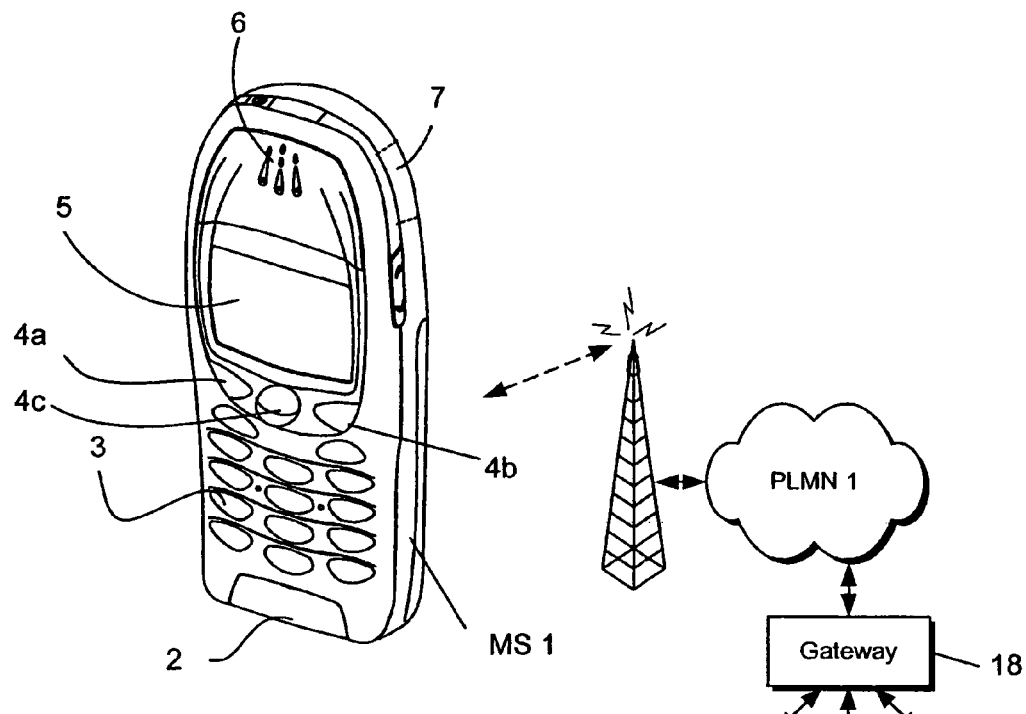
FIG. 1 is a schematic block diagram illustrating a mobile telephone handset which can communicate through a public land mobile network (PLMN) and through a gateway to remote data servers.

In FIG. 1, a mobile station in the form of a battery driven telephone cellular handset MS1, is shown schematically in radio communication with PLMN 1. The mobile handset MS1, includes a microphone 2, keypad 3, soft keys 4, a liquid crystal display device 5, ear-piece 6 and internal antenna 7.

Figure 2:
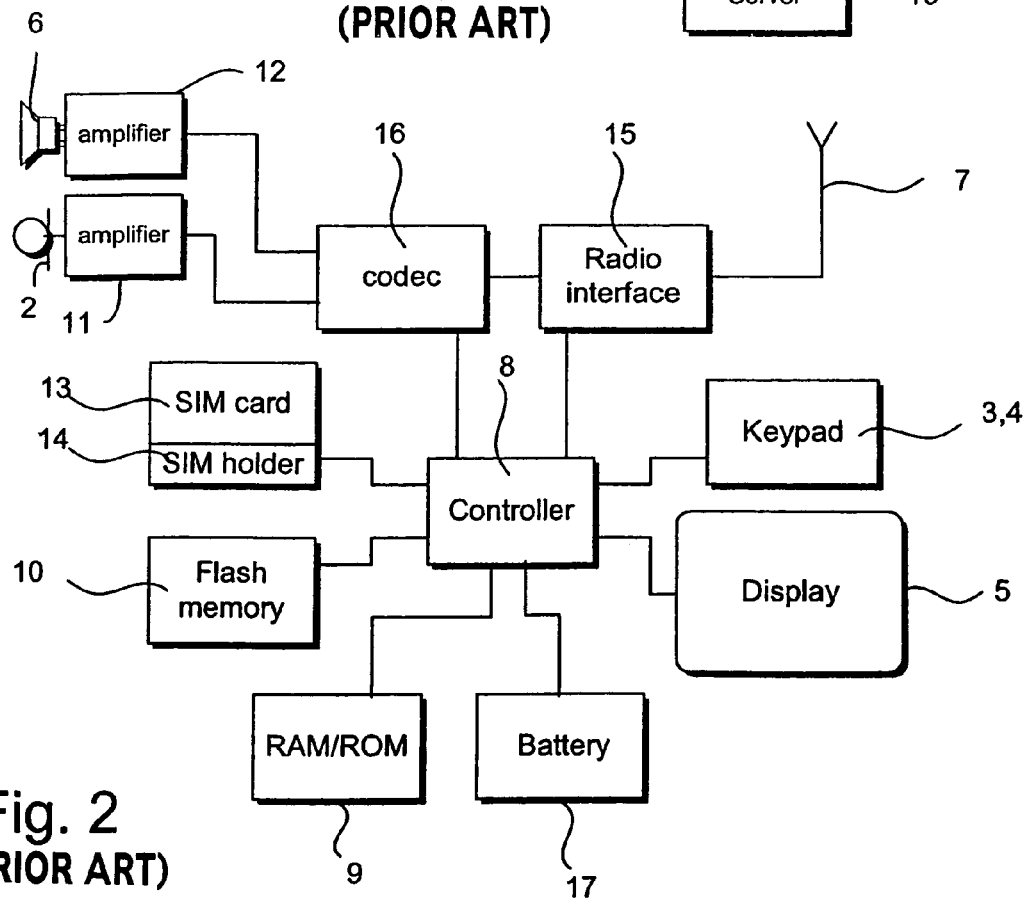
FIG. 2 is a schematic block diagram of the circuitry of the mobile handset shown in FIG. 1.

The circuitry of the handset MS1 is shown in more detail in FIG. 2. Signal processing is carried out under the control of a digital micro-controller 8 which has an associated RAM/ROM 9 and flash memory 10. Electrical analog audio signals are produced by microphone 2 and amplified by preamplifier 11. Similarly, analog audio signals are fed to the ear-piece 6 through an amplifier 12. The micro-controller receives instruction signals from the keypad and so-called soft keys 4a,b,c, and controls operation of the LCD display 5.

Information concerning the identity of the user is held on a smart card 13 in the form of a GSM SIM card which contains the usual GSM international mobile subscriber identity and encryption $K_i$ that is used for encoding the radio transmission in a manner well known per se. The SIM card 13 is removably received in a SIM card holder 14. Radio signals are transmitted and received by means of the antenna 7 connected through a radio stage 15 to a codec 16 configured to process signals under the control of a micro-controller 8.

Thus, in use, for speech, the codec 16 receives analog signals from the microphone amplifier 11, digitizes them into a form suitable for transmission and feeds them to the radio stage 15 for transmission through antenna element 7 to PLMN 1 shown in FIG. 1. Similarly, signals received from PLMN 1 are fed through the antenna element to be demodulated by the radio (radio frequency) stage 15 and fed to codec 16 so as to produce analog signals fed to amplifier 12 and ear-piece 6.

The mobile station MS1 is also configured to operate as a client to receive data from remote servers and to communicate through PLMN 1 to a gateway 18 shown in FIG. 1 which acts as a proxy server for connection to remote servers, such as server 19. For example, for a WAP enabled system, access to the gateway 18 is provided by dialing a telephone number associated with the gateway although other communication techniques can be used, for example, for GPRS and UMTS. The server 19 may provide data corresponding to individual sites, each with an individual homepage with a specific network address or universal resource locator (IJRL). The data may be provided in WML through the PLMN 1 to the handset MS1, which acts as a mobile client.

The mobile handset MS1 runs a microbrowser. The software for running the microbrowser may be held in flash memory 10 shown in FIG. 2, so as to be run by the micro-controller 8 and provide a display on display 5.

Figure 3:
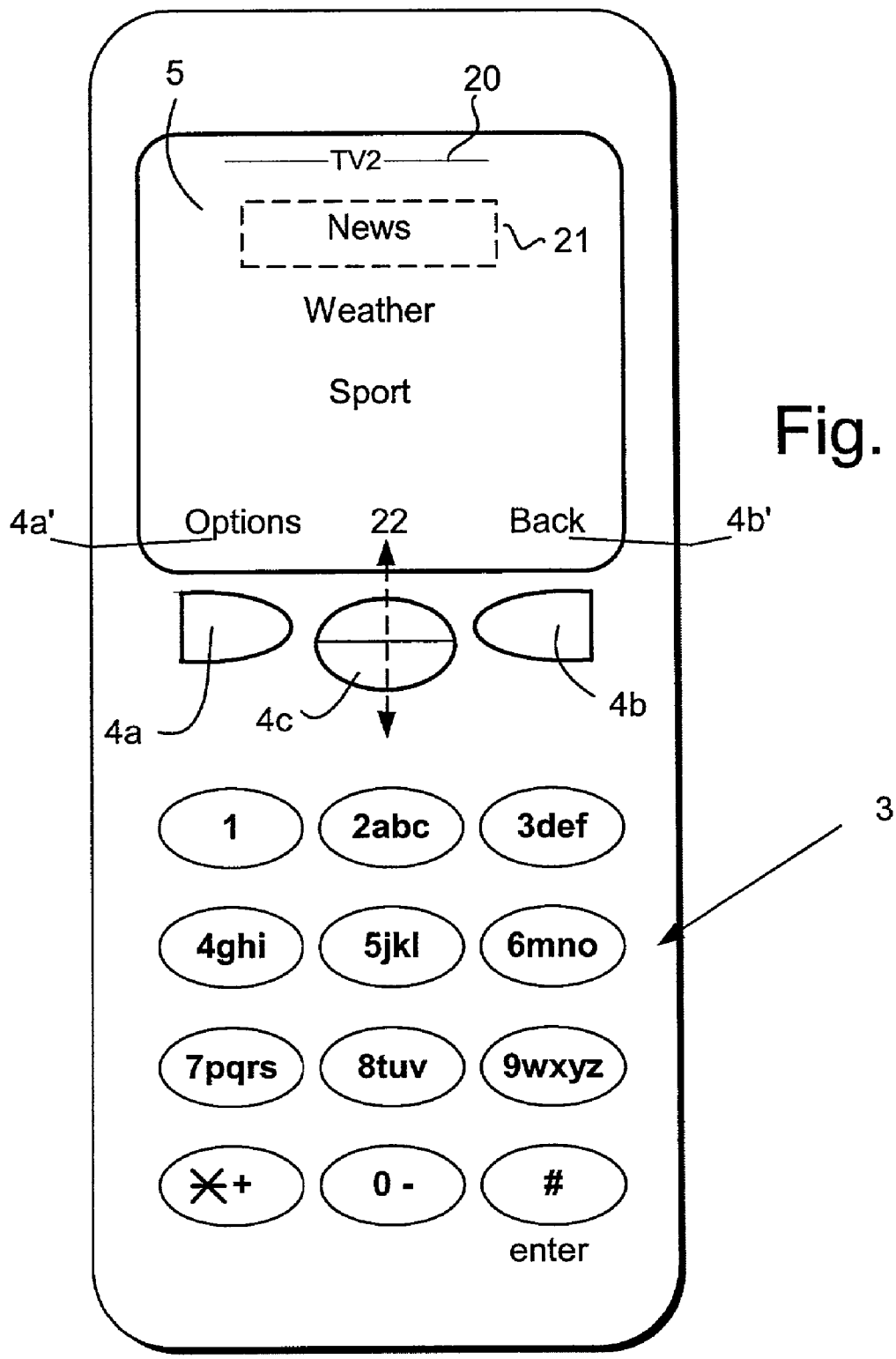
FIG. 3 illustrates schematically the display of the handset and the associated keys 4.

An example of the display provided by the microbrowser is shown in more detail in FIG. 3. In this example of the display 5, the user has accessed the homepage of a service provider TV2 as illustrated by information bar 20. A homepage for TV2 is shown with menu options "news", "weather" and "sport". These menu options comprise links to subsequent pages within the site, each with their own network address. The links may be selected using a so-called focus region 21 which can be scrolled upwardly and downwardly shown in FIG. 3 using key 4c, which can be pushed upwardly and downwardly in the direction of arrow 22 in order to perform a scrolling function. Thus, as shown in FIG. 3, the network address corresponding to "news" falls within the focus region 21.

Soft keys 4a and 4b are attributed functions shown on the display 5, which varies from display to display. For the homepage TV2 shown in FIG. 3, the keys 4a, 4b are attributed functions "options" and "back" respectively and appropriate legends 4a' and 4b' are displayed on the lcd display 5 under the control of software being run by controller 8. If the key 4a is actuated, a list of options, for example select, re-load, help etc. are displayed (not shown) on the display 5. The "select" function may then be chosen from the displayed list using the scrolling key 4c, in the event that the user wants to actuate the link to the "news" features shown on the home page of FIG. 3. At this time, the soft key function attributed to the key 4a is itself "select" so that an operation of the key 4a will cause the link to the news page within the focus region 21 to be actuated and navigation to the "news" network address is carried out. Once the news page or deck is reached, the key 4b is attributed with function "back" and so actuation of the key 4b returns the user to the screen display shown in FIG. 3. Similarly, if the key 4b shown in FIG. 3 is actuated, the user will be returned to the screen display associated with the previously navigated network address, namely "news". Thus, successive actuations of the soft key 4b, when attributed its "back" function causes the display to move back to the previous network address display. This may be made up of homepages for individual sites and pages cards or decks within individual sites. It will be understood that typically during a data session, a user will go to a site, navigate through addresses within the site, then move to another site and perform similar operations. Thus, successive operations of the back key will call back the network addresses successively in a reverse sequence to that in which they were visited Actuation of the "back" soft key 4b as described so far, is in a first mode, in which the key is actuated for a relatively short period, for example, less than one second, according to conventional keypad operation. However, in accordance with the invention, the soft key 4b can be operated in a second mode, of longer duration, for example, greater than one second to provide a display of previously visited homepages as shown in FIG. 4.

Figure 4:
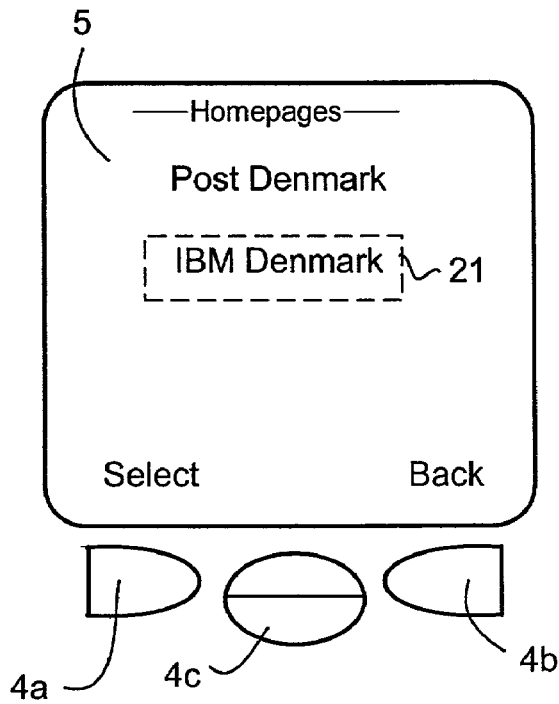
FIG. 4 illustrates the display produced by a long depression of one of the soft keys

In this particular data session, the user has previously navigated homepages for Post Denmark and IBM Denmark and the long-press operation of key 4b i.e. in the second mode, has produced a display of links to these homepages as shown in FIG. 4. The individual network addresses associated with pages decks or cards within these sites that were navigated previously were not shown in the display of FIG. 4.

The soft key 4a is attributed a "select" function so that the user can scroll using key 4c to select one of the homepages Post Denmark and IBM Denmark, by appropriately moving the focus region 21 and operating the select key 4a.

Thus, during a data session, the user can readily return to one of the homepages previously visited by operating the key 4b for a relatively long period, in the second mode, to produce a list of previously visited homepages and then quickly select one of them rather than go back successively through the individual network addresses by operating the key 4b in the first mode.

Figure 5:
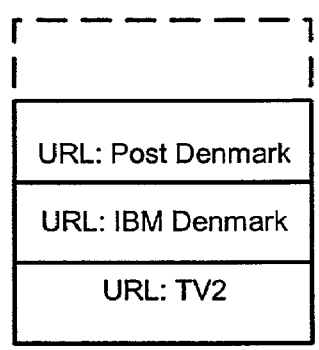
FIG. 5 is a schematic diagram of the homepage data held in memory.

FIG. 5 illustrates the memory organization of the RAM/ROM 9 shown in FIG. 2. Memory locations corresponding to URLs for the visited homepages are cached separately for subsequent recall in the second mode.

Figure 6:
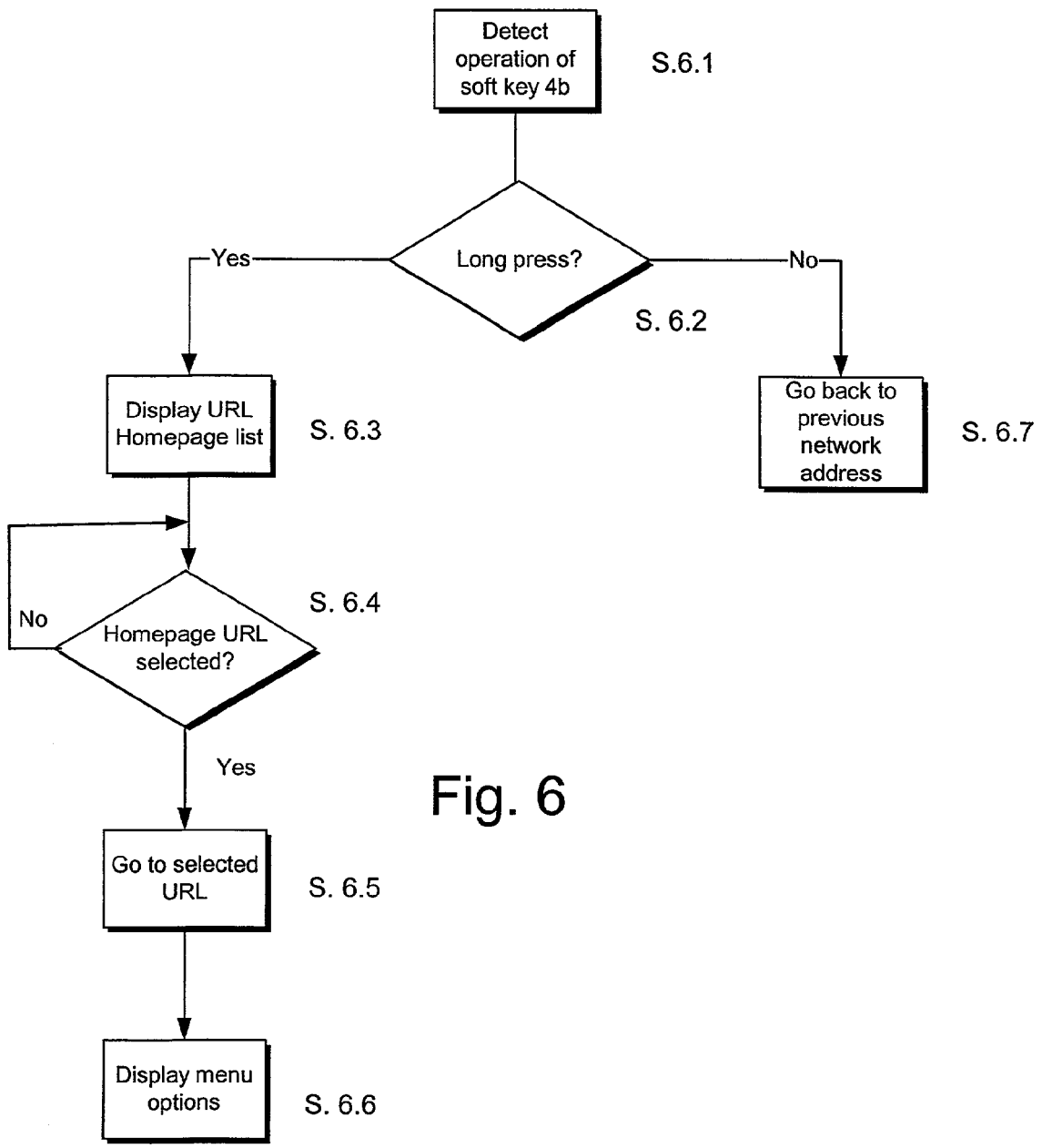
FIG. 6 is a schematic flowchart of a process for displaying the homepages previously visited so that one of them can be selected.

The process performed by controller 8 for operation of the key 4b is illustrated schematically in FIG. 6. When an operation of the soft key 4b is detected at step S6.1, a determination is made at step S6.2 whether the key was operated in the first or second mode that is whether it was pressed for longer than one second. If so, the homepage list shown in FIG. 5 is displayed on display 5, as shown at step S6.3. This results in the display shown in FIG. 4. If a homepage URL is subsequently selected by operation of scroll key 4*c* and select key 4*a* shown in FIG. 4, the browser navigates to the selected URIJ and the homepage is displayed on the display screen 5, including its menu options, as illustrated as step S6.6 i.e. in the manner shown in FIG. 3.

If at step S6.2, it is determined that the key 4*c* was operated in the first mode that is a short press of less than one second, the browser moves back to the previously displayed network address. This may be an individual page or card or a homepage depending on the sequence of network addresses visited by the user previously.

Many modifications and variations falling within the scope of the invention will be evident to those skilled in the art. For example, while the described example utilizes a "back" function for the soft key 4*b*, it will be understood that one of the soft keys may be attributed a "forward" function to enable forward navigation through previously visited homepages when operated in the second relatively long-press mode. Also, different ways of selecting the first and second mode can be used. For example, the second mode could be selected by two short key operations in close succession rather than one long key press and other alternatives will be readily apparent to those skilled in the art.

The invention is not restricted to the use of WAP technology but can be used in any mobile telecommunications system in which mobile devices act as clients for remote servers. Also, while the invention has been described in relation to the example of a telephone handset, it can be used in other mobile devices such as PDAs, gaming devices and remote handheld devices for home entertainment systems.

The invention claimed is:

1. An apparatus comprising a housing, a microphone, an earpiece, a display screen mounted in the housing, a plurality of keys mounted on the housing and individually depressible for performing telephony operations, radio circuitry, and a processor configured to provide a browser for navigating between different pages stored remotely of the apparatus and displaying information therefrom on the display screen, wherein an individual key of said plurality of keys is configured to operate in a first mode comprising a first depression sequence pattern of said individual key to navigate between previously visited pages and said individual key further being configured to operate in a second mode comprising a second depression sequence pattern of said individual key to provide a display of previously visited pages to permit the selection of a page from the display of previously visited pages and the navigation directly thereto.

2. An apparatus according to claim 1 wherein said individual key is operable to navigate backwards through previously visited pages.

3. An apparatus according to claim 1 wherein said individual key is operable to navigate forwardly through previously visited pages.

4. An apparatus according to claim 1 wherein the first and second modes are selected by operating said individual key for relatively shorter and longer periods respectively.

5. An apparatus according to claim 1 including a scrolling key operable to scroll a focus region through the display of previously visited pages for selecting one of the pages.

6. An apparatus according to claim 1 including a further key for selecting a page from the previously visited pages display so as to navigate directly thereto.

7. An apparatus according to claim 1 and comprising a mobile telephone handset.

8. An apparatus according to claim 1 and comprising a PDA.

9. An apparatus according to claim 1 wherein the display of the previously visited pages comprises a display of the previously visited pages whereby to permit the user to select one of the previously visited pages and navigate directly thereto.

10. An apparatus according to claim 1, which is WAP enabled.

* * * * *